United States Patent
Kashima et al.

(10) Patent No.: US 6,597,538 B1
(45) Date of Patent: Jul. 22, 2003

(54) SUSPENSION FOR DISK DRIVE

(75) Inventors: Hideki Kashima, Aiko-gun (JP); Osamu Iriuchijima, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/501,651

(22) Filed: Feb. 10, 2000

(30) Foreign Application Priority Data

Dec. 15, 1999 (JP) .......................... 11-356444

(51) Int. Cl.⁷ .............. G11B 5/48; G11B 21/16
(52) U.S. Cl. ........................................ 360/244.5
(58) Field of Search ............ 360/244.5, 244.6, 360/244.7

(56) References Cited

U.S. PATENT DOCUMENTS

| | | | |
|---|---|---|---|
| 4,167,765 A | | 9/1979 | Watrous |
| 4,991,045 A | | 2/1991 | Oberg |
| 5,172,286 A | * | 12/1992 | Jurgenson ............. 360/104 |
| 5,894,381 A | * | 4/1999 | Allen et al. ............ 360/104 |
| 5,896,245 A | * | 4/1999 | Aoyagi et al. ......... 360/104 |
| 5,896,246 A | * | 4/1999 | Budde et al. .......... 360/104 |
| 5,914,835 A | * | 6/1999 | Girard et al. .......... 360/104 |
| 6,046,885 A | * | 4/2000 | Aimonetti et al. ..... 360/104 |
| 6,230,959 B1 | * | 5/2001 | Heist et al. ............ 228/155 |
| 2001/0008475 A1 | * | 7/2001 | Takagi et al. ......... 360/244.8 |

FOREIGN PATENT DOCUMENTS

| | | |
|---|---|---|
| JP | 60-127578 | 7/1985 |
| JP | 63-234470 A | 9/1988 |
| JP | 8-153378 A | 6/1996 |
| JP | 9-115233 A | 5/1997 |

OTHER PUBLICATIONS

M. Hanya et al, "Suspension Design for Windage and High Bandwidth", (Treatise), Presented on Mar. 27, 2000, Japan.

* cited by examiner

*Primary Examiner*—William J. Klimowicz
(74) *Attorney, Agent, or Firm*—Frishauf, Holtz, Goodman & Chick, P.C.

(57) ABSTRACT

A suspension includes a load beam and a base plate. The load beam includes a beam body fixedly fitted with a flexure for supporting a head portion, a proximal portion fixedly fitted with the base plate, and a hinge portion connecting the beam body and the proximal portion. The hinge portion is formed on a part of a platelike spring member. The base plate includes a ring-shaped flange portion and a boss portion in the form of a short cylinder. The proximal portion of the load beam is bored with a circular hole having an inside diameter corresponding to the outside diameter of the base plate. The flange portion of the round base plate can be fitted in the hole.

9 Claims, 5 Drawing Sheets

SUSPENSION FOR DISK DRIVE

BACKGROUND OF THE INVENTION

The present invention relates to a suspension for disk drive incorporated in an information processing apparatus such as a personal computer.

A hard disk drive (HDD) for recording on or retrieving information from a rotating magnetic disk or magneto-optical disk includes a carriage that can turn around a shaft. The carriage is turned around the shaft by means of a positioning motor.

As described in U.S. Pat. No. 4,167,765, for example, the carriage is provided with an arm (actuator arm), a suspension on the distal end portion of the arm, a head portion including a slider attached to the suspension, etc. When the slider is slightly lifted from the disk surface as the disk rotates at high speed, an air bearing is formed between the disk and the slider.

The suspension comprises a load beam formed of a precise thin plate spring, a flexure formed of a very thin plate spring that is fixed to the distal end portion of the load beam by laser welding or the like, and a base plate fixed to the proximal portion of the beam by laser welding or the like. The base plate is fixed to a suspension mounting surface of the arm.

As the density of the information to be recorded on the disk and the operating speed of the disk drive of this type become higher, the seek time for the information is expected to be shortened. In order to shorten the seek time, the operation of a moving element (e.g., the aforesaid suspension) of the disk drive should be speeded up by reducing the weight of the moving element.

The suspension, such as a conventional suspension 1 shown in FIG. 12, comprises a load beam 2 and a base plate 3. A boss portion 4 is formed on the base plate 3. The base plate 3 is put on a proximal portion 2a of the load beam 2 and fixed to the proximal portion 2a by laser welding or the like. The load beam 2 includes a main portion 2b and a flat flexible portion 2c. The main portion 2b is enhanced in bending stiffness by means of reinforcing portions, such as bent edges 5 or ribs, formed thereon. When bending load acts on the load beam 2, therefore, the flexible portion 2c bends in a region near a front edge 3a of the base plate 3 that mainly serves as a supporting end for the load. Thus, the front edge 3a of the base plate 3 of the conventional suspension 1 is expected to extend at right angles to an axis C of the load beam 2. Accordingly, the base plate 3 used is substantially square.

Since area of the square base plate 3 is inevitably large, however, its weight can be reduced only limitedly. Since the front edge 3a of the base plate 3 serves as the load supporting end, moreover, the plate 3 must be accurately positioned with respect to its rotating direction (indicated by arrow R in FIG. 12) so that the front edge 3a extends at right angles to the axis C of the load beam 2. If the base plate is dislocated in the rotating direction R, as indicated by two-dot chain line F in FIG. 12, its front edge 3a skews at an angle to the axis C of the load beam 2, so that the spring properties of the flexible portion 2c change.

In order to locate the head portion on the suspension with high accuracy, the position of the base plate 3 on the load beam 2 must be accurately regulated with respect to the x- and y-axis directions shown in FIG. 12. For these reasons, the positioning operation for the fixation of the base plate 3 to the load beam 2 requires special consideration.

Conventionally, in fixing the suspension to the actuator arm, a swaging process is carried out such that the boss portion 4 is spread after it is inserted into a hole in the arm. If the base plate 3 of the conventional suspension 1 is deformed during this swaging process, the flexible portion 2c near the front edge 3a is easily influenced by the deformation. If the flexible portion 2c is influenced by the deformation, its spring properties change, so that the flying height of the head portion (slider) varies, and the resonance characteristic lowers.

BRIEF SUMMARY OF THE INVENTION

Accordingly, an object of the present invention is to provide a suspension capable of reduction in weight and of preventing a load beam from being influenced by the deformation of a base plate. Another object of the invention is to provide a suspension in which a load beam and a base plate can be easily positioned with respect to each other.

In order to achieve the above objects, a load beam of a suspension according to the present invention comprises a beam body fixedly fitted with a flexure for supporting a head portion, a proximal portion fixedly fitted with a base plate, and a hinge portion situated between the beam body and the proximal portion and having bending stiffness lower than that of the beam body and the proximal portion, the base plate having a circular outer peripheral portion. When bending load acts on the load beam, the hinge portion bends, whereupon predetermined spring properties can be enjoyed. According to the present invention, the weight of the suspension can be reduced by making the round base plate lighter in weight. Thus, the weight of a moving element of a disk drive can be reduced to cope with higher-speed operation of the disk drive. Since the round base plate has no directivity with respect to its rotating direction, it can be easily positioned relatively to the load beam. If the base plate is deformed as the suspension is fixed to the actuator arm, moreover, the load beam cannot be easily influenced by the deformation.

The base plate includes, for example, a ring-shaped flange portion and a boss portion in the form of a short cylinder rising in the thickness direction of the base plate from the inner peripheral edge of the flange portion. The base plate can be positioned with respect to the load beam by putting the flange portion on the proximal portion of the load beam or by fitting the base plate into a circular hole in the proximal portion. According to the present invention, the base plate can be positioned more easily and accurately with respect to the load beam. The weight of the suspension can be further reduced by making the flange portion thinner than the proximal portion. Besides, the proximal portion of the load beam, which is higher in stiffness and accuracy than the base plate, can be put directly on a suspension mounting surface of the actuator arm.

In the load beam of the present invention, the beam body and the proximal portion may be separate components connected to each other by means of the hinge portion formed of a spring member. According to the present invention, the respective materials and thicknesses of the various parts including the beam body, proximal portion, and hinge portion can be optimized depending on their required properties.

Further, the beam body, the proximal portion, and the hinge portion, thinner than the beam body and the proximal portion, may be integrally formed of a common material. In this case, the hinge portion can be formed by reducing the thickness of a part of the material by partial etching or the like. According to the present invention, the beam body, proximal portion, and hinge portion are integral with each other, so that the number of components that constitute the load beam can be reduced, and the beam construction can be simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
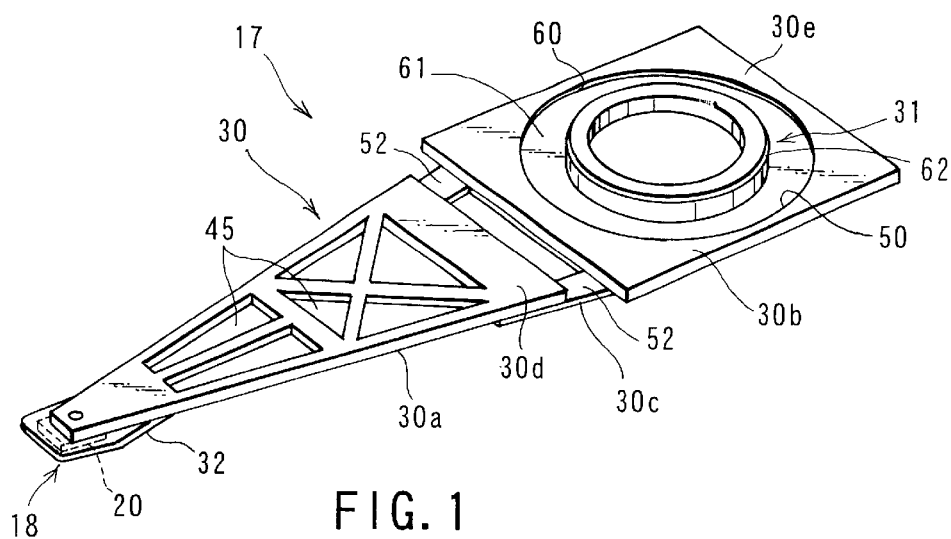
FIG. 1 is a perspective view of a suspension for disk drive according to a first embodiment of the present invention.

A first embodiment of the present invention will now be described with reference to FIGS. 1 to 5. A hard disk drive (HDD) 10 shown in FIG. 5 includes a cartridge 12 that can turn around a shaft 11. The cartridge 12 is turned around the shaft 11 by means of a positioning motor 13 such as a voice coil motor.

The carriage 12 is provided with a plurality of arms (actuator arms) 16, suspensions 17 mounted individually on the respective distal end portions of the arms 16, head portions 18 provided individually on the respective distal end portions of the suspensions 17, etc. When the carriage 12 is actuated by the motor 13, each head portion 18 moves to a desired track of its corresponding disk 19.

Each head portion 18 includes a slider 20, which is situated in a position such that it can face the recording surface of the disk 19, a transducer (not shown) held thereon, etc. When the disk 19 rotates at high speed, the slider 20 is slightly lifted from the disk 19 by air between them, whereupon an air bearing is formed between the disk 19 and the slider 20.

As shown in FIG. 1, each suspension 17 includes a load beam 30, a base plate 31, and a flexure 32. The head portion 18 is mounted on the flexure 32.

Figure 2:
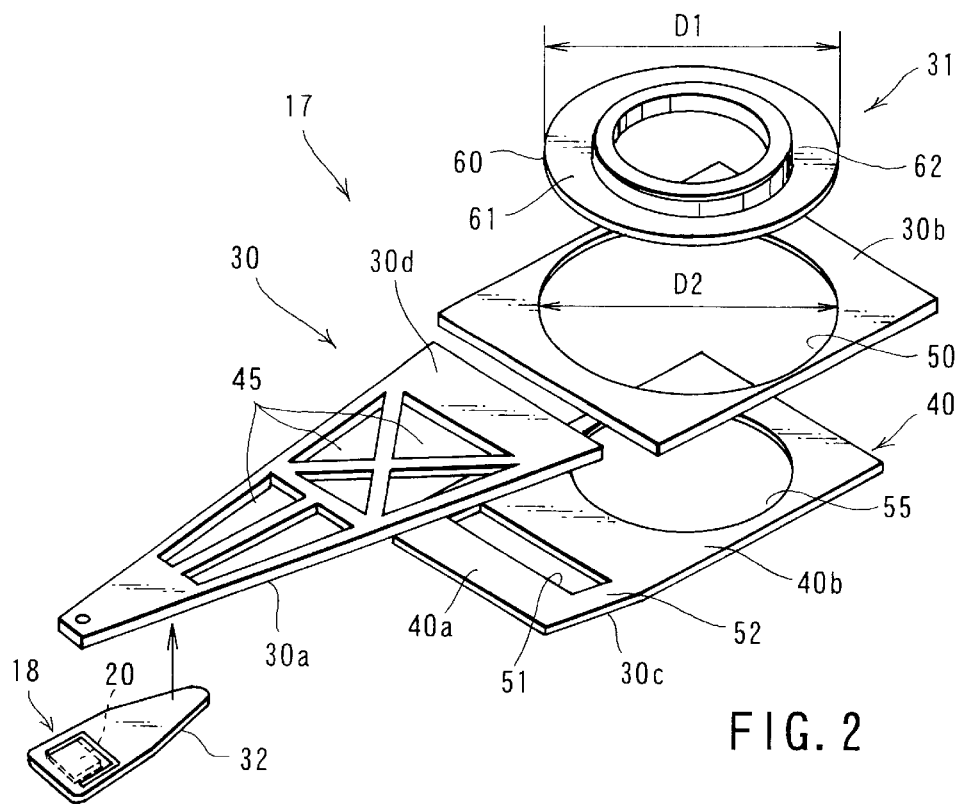
FIG. 2 is an exploded perspective view of the suspension shown in FIG. 1.

As shown in FIG. 2, each load beam 30 is composed of three portions including a beam body 30a to which the flexure 32 is fixed, a proximal portion 30b to which the base plate 31 is fixed, and a hinge portion 30c formed of a thin plate spring member 40. To reconcile lightweight and high stiffness, the beam body 30a according to this embodiment is formed of a light alloy, such as an aluminum alloy, and is penetrated by apertures 45 in the thickness direction. The apertures 45 may be replaced with recesses that are formed in a part of the beam body 30a by, for example, etching.

Formed in the center of the proximal portion 30b is a circular hole 50 with an inside diameter D2 that is just fit for the round base plate (mentioned later) 31. A light metal (lower in specific gravity than iron), such as a titanium or aluminum alloy, or a synthetic resin may be used as the material of the beam body 30a and the proximal portion 30b. By doing this, the load beam 30 can be reduced in weight, and its frequency and vibration characteristics can be improved.

An aperture 51 is formed in a part of the platelike spring member 40 by etching or precision pressing. A springy flexible hinge portion 30c is formed in a manner such that the bending stiffness (spring constant) of portions 52 that are situated on the opposite sides of the aperture 51 is lower than that of the regions that are free of the aperture 51.

Figure 4:
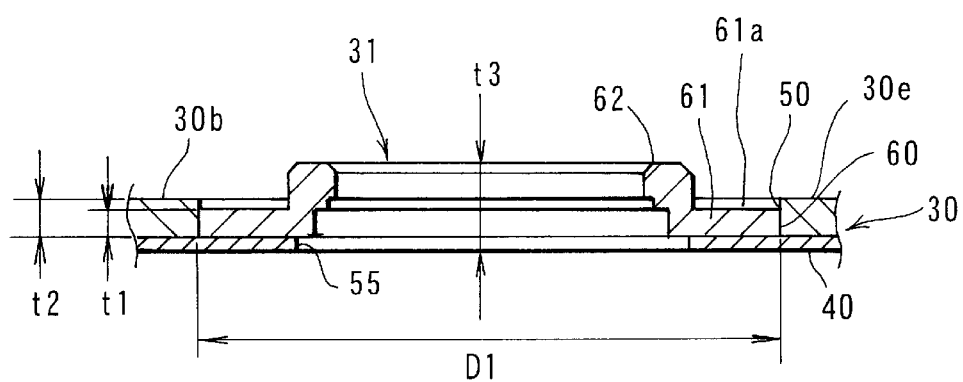
FIG. 4 is a partial sectional view of the suspension taken along line F4—F4 of FIG. 3.

For example, the spring member 40 is formed of a thin springy rolled stainless-steel sheet that is thinner than the beam body 30a and the proximal portion 30b. A circular through hole 55 is formed in that portion of the spring member 40 which is situated corresponding to the hole 50 of the proximal portion 30b. The inside diameter of the through hole 55 is smaller than an outside diameter D1 of the base plate 31. When the base plate 31 is fitted in the hole 50 of the proximal portion 30b, as shown in FIG. 4, therefore, the base plate 31 is supported by the spring member 40.

Figure 3:
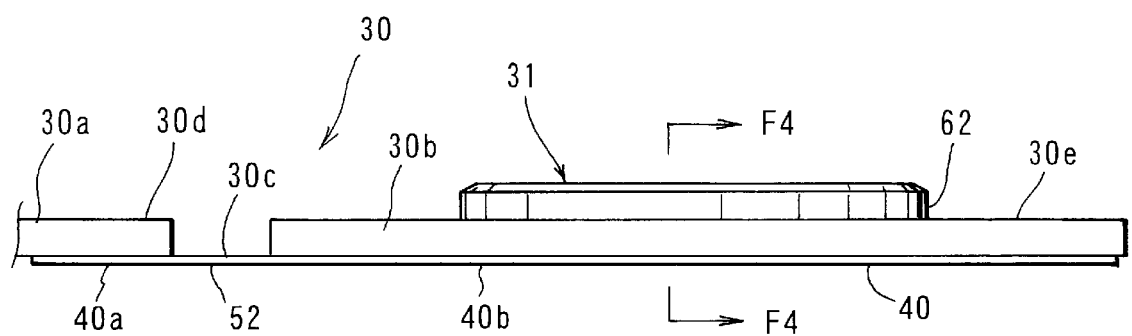
FIG. 3 is a partial side view of the suspension shown in FIG. 1.

As shown in FIG. 3 and other drawings, one end portion 40a of the spring member 40 is put on and fixed to an end portion 30d of the beam body 30a by laser welding or the like. The remaining portion 40b of the spring member 40 is put on and fixed to the proximal portion 30b of the load beam 30 by laser welding or the like. The spring member 40 may be fixed to the beam body 30a and the proximal portion 30b with use of an adhesive in place of welding.

The flexure 32, which is formed of a very thin plate spring (e.g., rolled stainless-steel material), is fixed to a predetermined portion of the beam body 30a by laser welding or the like. The slider 20, which constitutes each head portion 18, is mounted on the flexure 32.

The base plate 31 includes a ring-shaped flange portion 61, which has a circular outer peripheral portion (outline) 60, and a boss portion 62 in the form of a short cylinder that rises in the thickness direction of the base plate 31 from the inner peripheral edge of the flange portion 61. As shown in FIG. 4, a thickness t1 of the flange portion 61 is smaller than a thickness t2 of the proximal portion 30b. Therefore, a surface 61a of the flange portion 61 is slightly recessed inward from a surface 30e of the proximal portion 30b. The outside diameter D1 of the base plate 31 is a dimension such that the plate 31 can be just fitted in the hole 50 of the proximal portion 30b.

Figure 5:
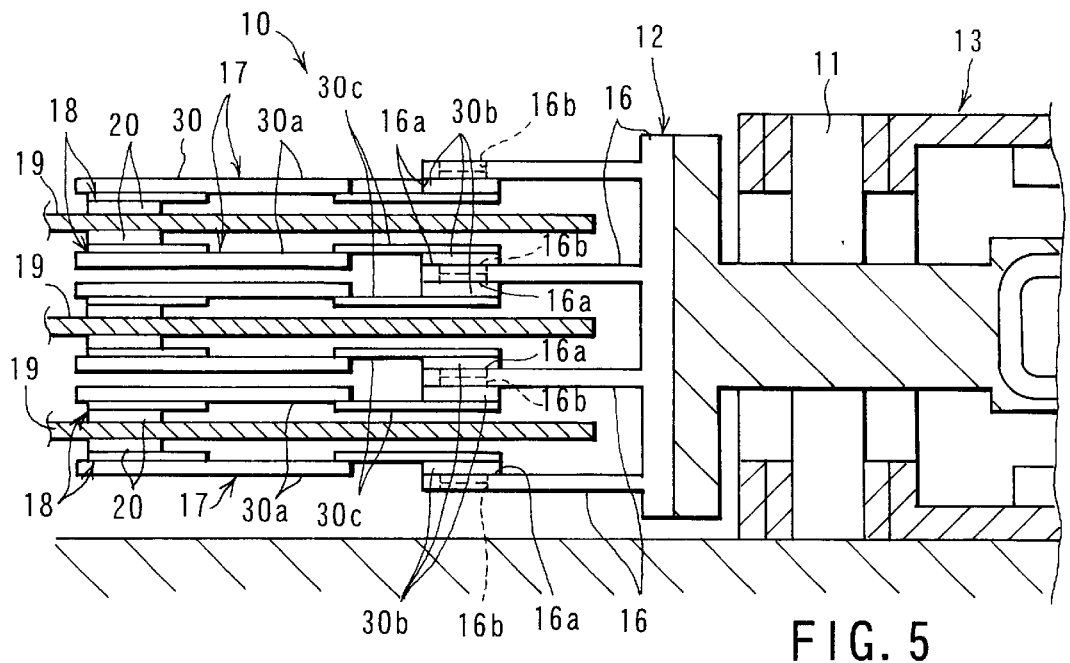
FIG. 5 is a partial sectional view of a hard disk drive provided with the suspension shown in FIG. 1.

As shown in FIG. 5, each proximal portion 30b is fixed to a, suspension mounting surface 16a of its corresponding actuator arm 16. More specifically, each suspension 17 is fixed to the actuator arm 16 by a swaging process such that the boss portion 62 is spread by means of a jig after it is inserted into a circular hole 16b in the arm 16. In the case of this embodiment, the surface 61a of the flange portion 61 is recessed inside the surface 30e of the proximal portion 30b, so that the surface 30e is allowed to touch the suspension mounting surface 16a.

Normally, a relatively soft metal is used for the base plate 31 to facilitate the swaging process. On the other hand, a metal that is harder than the base plate 31 is used for the proximal portion 30b. Thus, the surface 30e of the proximal portion 30b that is formed of the hard material comes into contact with the suspension mounting surface 16a. Accordingly, the flatness and hardness of the contact surface of each suspension 17 on the actuator arm 16 can be made so high that the bonding accuracy and bonding strength are improved. Further, a thickness $t3$ (shown in FIG. 4) of a portion that includes the boss portion 62 can be made thinner than in the case where the flange portion 61 is put on the surface 30e of the proximal portion 30b (shown in FIG. 10).

The round base plate 31 can be made much smaller and lighter in weight than a square base plate of which each side is as long as its outside diameter D1. While a conventional square base plate with a thickness of 0.15 mm and width of 5 mm weighs 17.39 mg, for example, the round base plate 31 according to this embodiment weighs 13.50 mg, thus ensuring a 22.37% reduction in weight. The weight of the base plate 31 can be further reduced by making the thickness $t1$ of the base plate 31 smaller than the thickness $t2$ of the proximal portion 30b as shown in FIG. 4.

Figure 12:
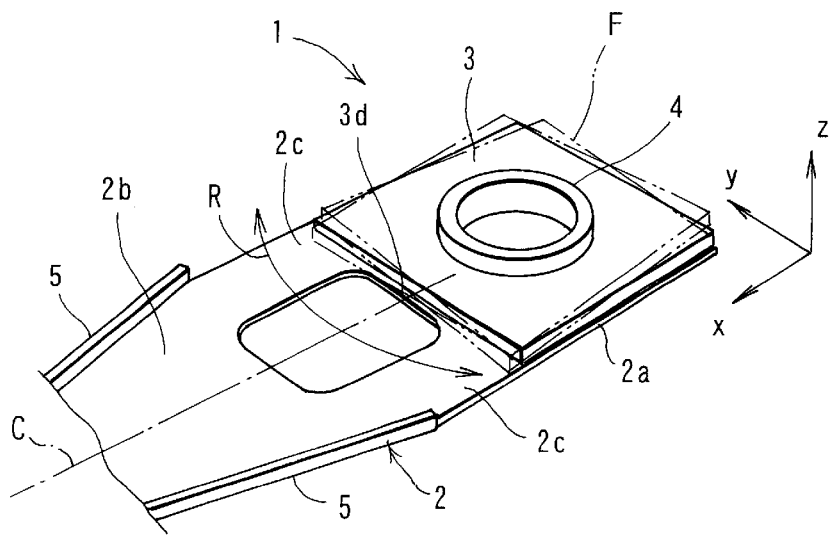
FIG. 12 is a perspective view showing a part of a conventional suspension.

The base plate 31 can be positioned in the x- and y-axis directions shown in FIG. 12 by only being fitted in the circular hole 50 in the proximal portion 30b. Since the round base plate 31 has no directivity with respect to its rotating direction around the z-axis, moreover, it can be easily positioned relatively to the load beam 30.

In each suspension 17 according to this embodiment, the beam body 30a, proximal portion 30b, and hinge portion 30c that constitute the load beam 30 are separate components, so that suitable materials and thicknesses can be selected individually for those components. Accordingly, it is easy to reconcile the necessary performance (e.g., high stiffness) for the beam body 30a and the required performance (e.g., low spring constant) for the hinge portion 30c. Since a high-accuracy rolled material is used for the spring member 40 that constitutes the hinge portion 30c, moreover, the hinge portion 30c can enjoy a steady low spring constant.

Figure 6:
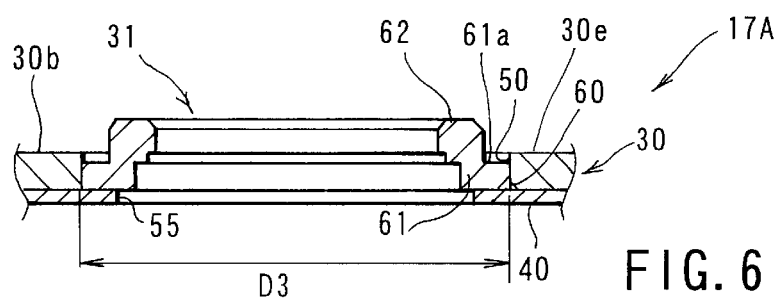
FIG. 6 is a partial sectional view of a suspension according to a second embodiment of the invention.

FIG. 6 shows a part of a load beam 30 and a base plate 31 of a suspension 17A according to a second embodiment of the invention. An outside diameter D3 of a flange portion 61 of the base plate 31 of this embodiment is smaller than the outside diameter D1 of the flange portion 61 of the first embodiment. A description of other arrangements, functions, and effects of the suspension 17A of the second embodiment is omitted because they are shared by the suspension 17 of the first embodiment.

Figure 7:
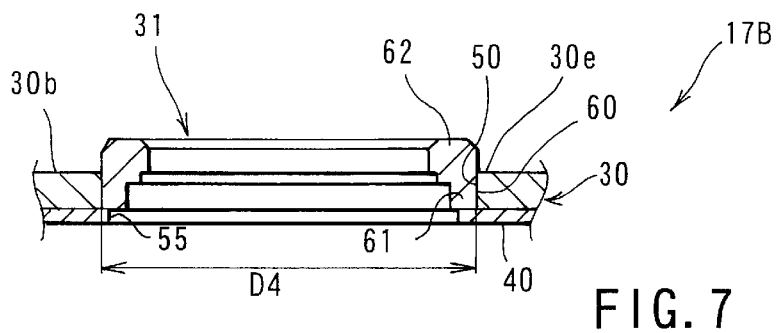
FIG. 7 is a partial sectional view of a suspension according to a third embodiment of the invention.

FIG. 7 shows a part of a load beam 30 and a base plate 31 of a suspension 17B according to a third embodiment of the invention. An outside diameter D4 of a flange portion 61 of the base plate 31 of this embodiment is substantially equal to the outside diameter of a boss portion 62. Other arrangements, functions, and effects of the suspension 17B of the third embodiment are shared by the suspension 17 of the first embodiment. Thus, the outside diameter (flange width) of the base plate 31 and the inside diameter of the hole 50 can be suitably selected as required, as in the cases of these representative embodiments.

Figure 8:
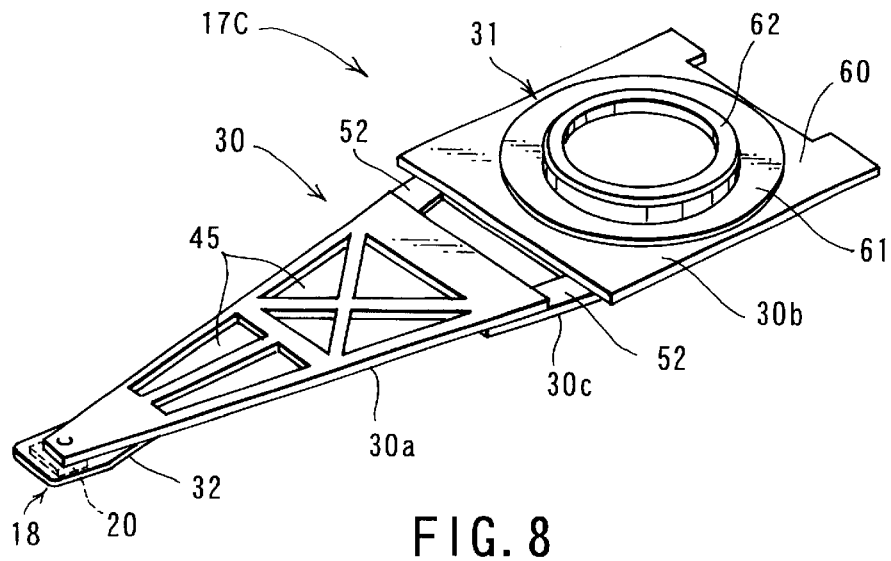
FIG. 8 is a perspective view of a suspension according to a fourth embodiment of the invention.
Figure 9:
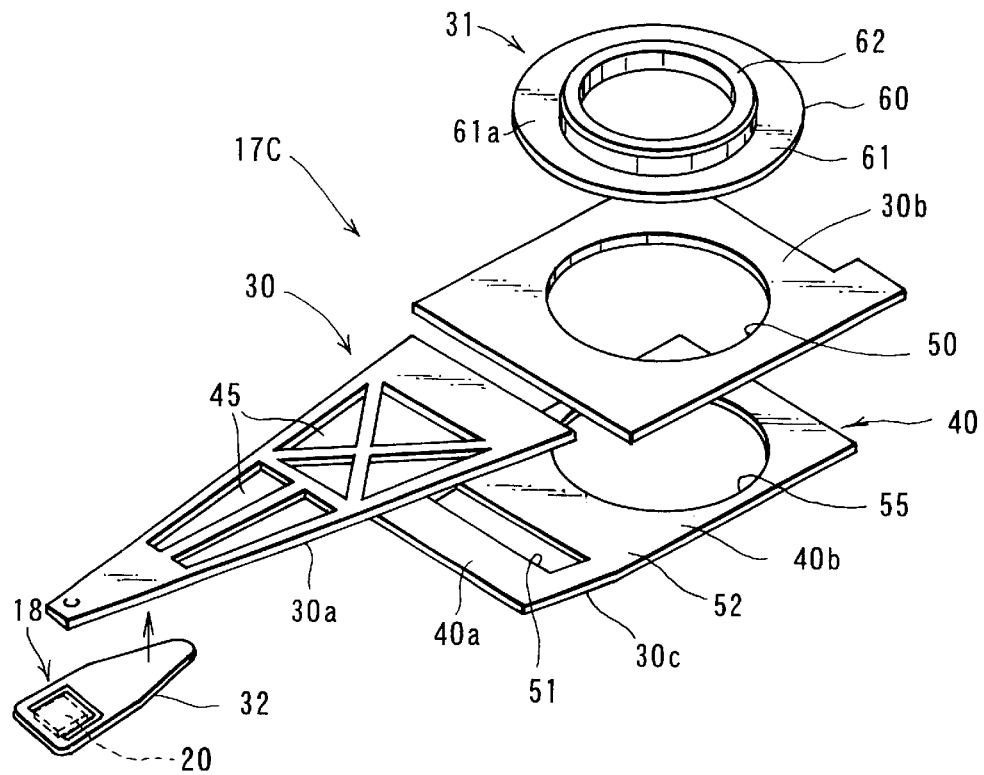
FIG. 9 is an exploded perspective view of the suspension shown in FIG. 8.
Figure 10:
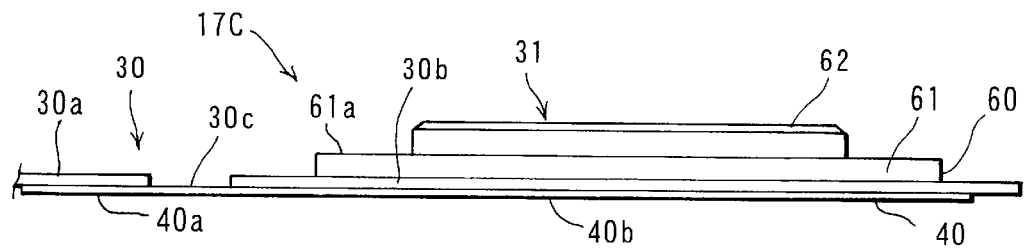
FIG. 10 is a partial side view of the suspension shown in FIG. 8.

FIGS. 8 to 10 show a suspension 17C according to a fourth embodiment of the invention. In this suspension 17C, a flange portion 61 of a base plate 31 is put on a predetermined portion of a proximal portion 30b of a load beam 30. The flange portion 61 is fixed to the proximal portion 30b by laser welding or with use of an adhesive. In this case, a surface 61a of the flange portion 61 is brought into contact with the suspension mounting surface 16a of its corresponding actuator arm 16 (shown in FIG. 5). For other arrangements, the suspension 17C of the fourth embodiment resembles the suspension 17 of the first embodiment. Accordingly, like reference numerals are used to designate portions that are common to the two suspensions, and a description of those portions is omitted.

Figure 11:
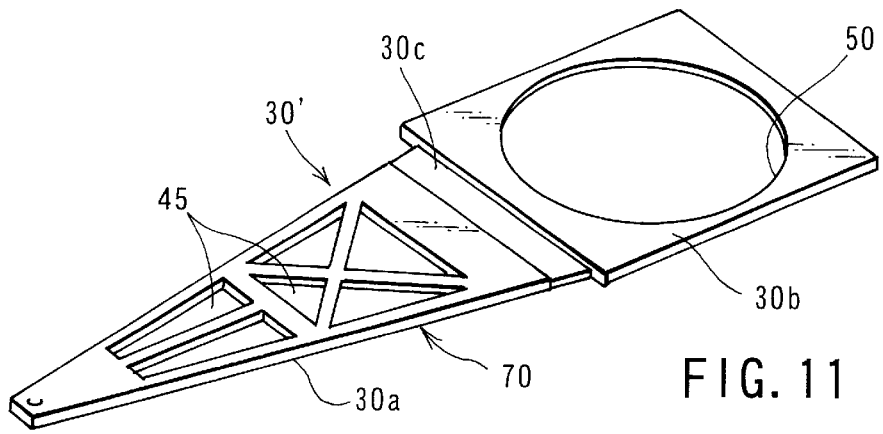
FIG. 11 is a perspective view of a load beam of a suspension according to a fifth embodiment of the invention.

In a load beam 30' according to a fifth embodiment shown in FIG. 11, a beam body 30a, proximal portion 30b, and hinge portion 30c are integrally formed of one metal plate 70. The hinge portion 30c is formed by making a longitudinally intermediate portion of the metal plate 70 thinner than the beam body 30a and the proximal portion 30b by partial etching or the like. The hinge portion 30c extends in the crosswise direction of the load beam 30', that is, at right angles to the axis of the beam 30'. The proximal portion 30b is formed having a circular hole 50, which resembles that of the suspension 17 of the first embodiment, and the base plate 31 (shown in FIG. 2 or some other drawing) is fitted in the hole 50.

In the load beam 30' of this embodiment, the beam body 30a, the proximal portion 30b and the hinge portion 30c are integral with each other, so that the number of components that constitute the beam 30' can be reduced. For other arrangements, functions, and effects, a suspension that is provided with the load beam 30' of the fifth embodiment resembles the suspension 17 according to the first embodiment, so that common reference numerals are used to designate portions that are common to the first and fifth embodiments, and a description of those portions is omitted.

It is to be understood that the components of the suspension, such as the load beam, the flexure, beam body, proximal portion, hinge portion, base plate, etc., may be suitably modified without departing from the scope or spirit of the invention in carrying out the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. In a suspension for a disk drive having a load beam and a base plate, the load beam comprising:
   a beam body fixedly fitted with a flexure for supporting a head portion;
   a proximal portion fixedly fitted with the base plate; and
   a hinge portion situated between the beam body and the proximal portion and having bending stiffness lower than that of the beam body and the proximal portion,
   said base plate including a ring-shaped flange portion at its outer peripheral edge and a boss portion in the form of a short cylinder rising in the thickness direction of the base plate from an inner peripheral edge of the flange portion, the flange portion of the base plate having a substantially complete and circular periphery, wherein the proximal portion is bored with a hole having an inside diameter corresponding to the outside diameter of the base plate such that the round base plate can be fitted in the hole.

2. A suspension for disk drive according to claim 1, wherein said beam body and said proximal portion are separate components connected to each other by means of the hinge portion formed of a platelike spring member.

3. A suspension for disk drive according to claim 1, wherein said beam body, said proximal portion, and said hinge portion, thinner than the beam body and the proximal portion, are integrally formed of a common material.

4. A suspension for disk drive according to claim 1, wherein the periphery of the ring-shaped flange is entirely circular.

5. A suspension for disk drive according to claim 1, wherein the flange portion of the base plate is thinner than the proximal portion.

6. In a suspension for a disk drive having a load beam and a base plate, the load beam comprising:

a beam body fixedly fitted with a flexure for supporting a head portion;

a proximal portion fixedly fitted with the base plate; and a hinge portion situated between the beam body and the proximal portion and having a bending stiffness lower than that of the beam body and the proximal portion, said base plate including a ring-shaped flange portion at its outer peripheral edge and a boss portion in the form of a short cylinder rising in the thickness direction of the base plate from an inner peripheral edge of the flange portion, the flange portion of the base plate having a substantially complete and circular periphery, wherein the surface of the flange portion of the base plate on the side opposite to the side the boss portion is formed is fixed to the proximal portion of the load beam.

7. In a suspension for a disk drive having a load beam and a base plate, the load beam comprising:

a beam body fixedly fitted with a flexure for supporting a head portion;

a proximal portion fixedly fitted with the base plate; and a hinge portion situated between the beam body and the proximal portion and having bending stiffness lower than that of the beam body and the proximal portion, said base plate including a ring-shaped flange portion and a boss portion in the form of a short cylinder rising in the thickness direction of the base plate from an inner peripheral edge of the flange portion, the flange portion of the base plate having a substantially complete and circular periphery, wherein said beam body, said proximal portion, and said hinge portion, thinner than the beam body and the proximal portion, are integrally formed of a common material.

8. A suspension for disk drive according to claim 7, wherein said beam body and said proximal portion are separate components connected to each other by means of the hinge portion formed of a platelike spring member.

9. A suspension for disk drive according to claim 7, wherein the periphery of the ring-shaped flange is entirely circular.

* * * * *